Figure 1:
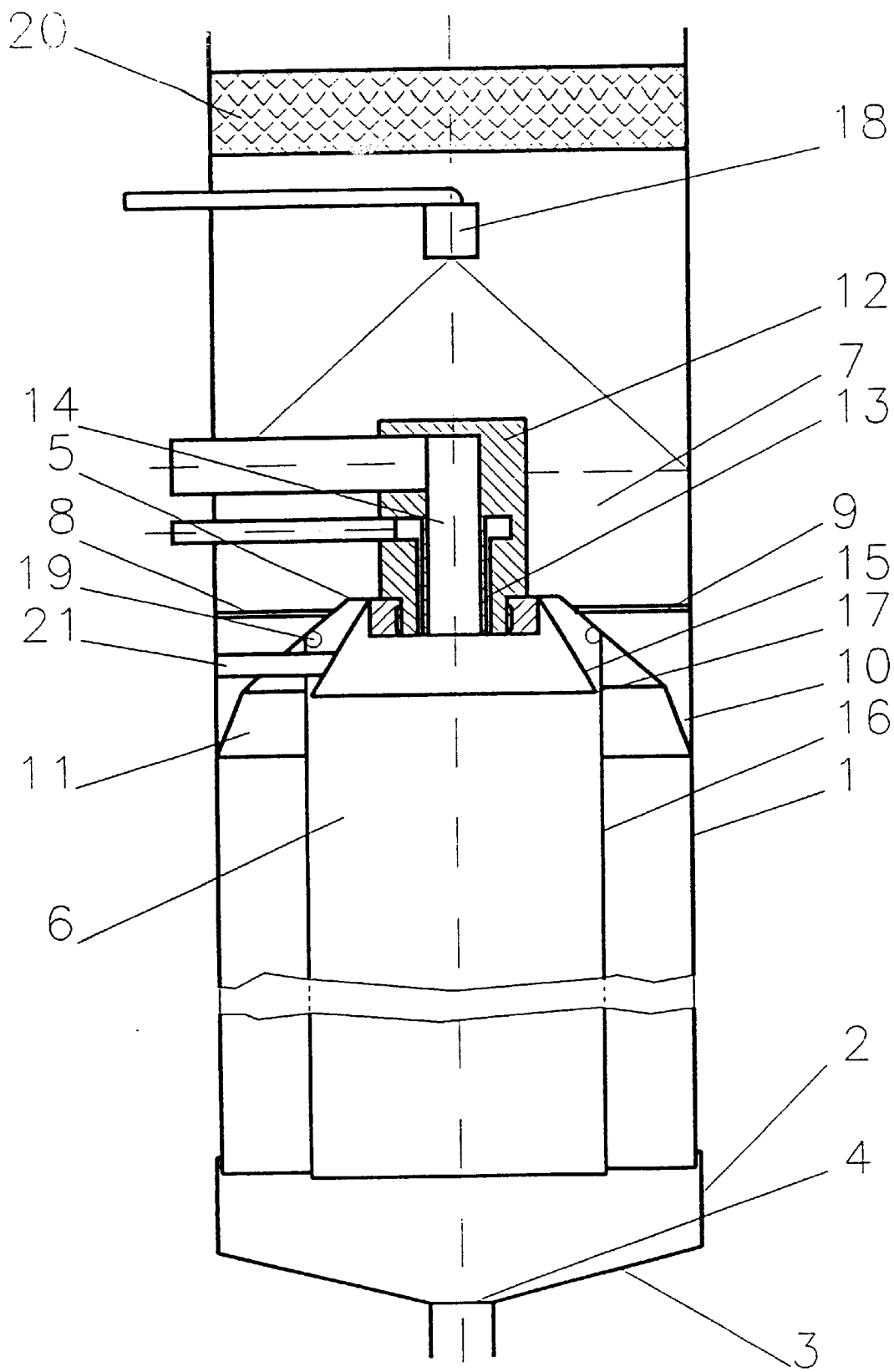

United States Patent
Hartung et al.

[11] Patent Number: 5,900,217
[45] Date of Patent: May 4, 1999

[54] APPARATUS FOR PURIFYING WASTE GASES

[75] Inventors: Rolf Hartung, Blaubeuren; Hans Autenrieth, Blaubeuren/Gerhausen; Gunter Kroedel, Dresden; Lutz Fabian, Dresden; Dietmar Resch, Dresden, all of Germany

[73] Assignee: Centrotherm Elektrische Anlagen GmbH & Co., Blaubeuren, Germany

[21] Appl. No.: 08/875,312
[22] PCT Filed: Jan. 19, 1996
[86] PCT No.: PCT/DE96/00076
§ 371 Date: Sep. 2, 1997
§ 102(e) Date: Sep. 2, 1997
[87] PCT Pub. No.: WO96/23173
PCT Pub. Date: Aug. 1, 1996

[30] Foreign Application Priority Data

Jan. 23, 1995 [DE] Germany .................. 195 01 914

[51] Int. Cl.[6] ............................................... B01D 50/00
[52] U.S. Cl. ................................... 422/171; 422/172
[58] Field of Search .......................... 422/168, 171, 422/172

[56] References Cited

U.S. PATENT DOCUMENTS 5,123,836  6/1992  Yoneda et al. .

FOREIGN PATENT DOCUMENTS 03 46893  12/1989  European Pat. Off. .

*Primary Examiner*—Carroll B. Dority
*Attorney, Agent, or Firm*—Jordan and Hamburg

[57] ABSTRACT

An apparatus for purifying waste gases, particularly waste gases from CVD (chemical vapor deposition), plasma etching or similar processes, with at least one combustion space, which is in a vertical arrangement within an outer pipe and is limited at the top by an umbrella-like cover, and an internally or externally mixing burner, the combustion gas nozzles of which protrude into the combustion space, combustion gas, oxygen or air and waste gas being supplied to the burner, as well as to means for supplying and discharging oxidizing agents and/or absorbents to a scrubbing space above the combustion space. By means of the invention, an apparatus is to be provided for purifying waste gases, which can be manufactured cost-effectively and by means of which the disadvantages of the state of the art are avoided. The invention is characterized in that the burner (12) is fastened centrally in the cover (5), the burner (12) has combustion gas nozzles (13) and at least one waste gas nozzle (14), which are directed vertically downwards into the combustion space (6), and that the reaction products, formed during the combustion process, are passed along the inside of the outer pipe (1) into the scrubbing space (7).

21 Claims, 6 Drawing Sheets

APPARATUS FOR PURIFYING WASTE GASES

The invention relates to an apparatus for purifying waste gases, particularly waste gases from CVD (chemical vapor deposition), plasma etching or similar processes, with at least one combustion space, which is in a vertical arrangement within an outer pipe and is limited at the top by an umbrella-like cover, and an internally or externally mixing burner, the combustion gas nozzles of which protrude into the combustion space, combustion gas, oxygen or air and waste gas being supplied to the burner, as well as to means for supplying and discharging oxidizing agents and/or absorbents to a scrubbing space above the combustion space.

The purification of such waste gases usually takes place in two steps, in that the waste gases initially are combusted and subsequently purified in a scrubber. The combustion of the waste gases or their oxidation takes place in these cases with the help of gas-operated burners within a combustion chamber.

The EP 0 346 893 B1 discloses such an apparatus for purifying waste gases, which consists of a basic body of circular cross section, which is essentially closed at the bottom and open at the top. This basic body consists of a cylindrical outer wall and an inner wall, which is disposed concentrically to the outer wall and forms the boundary of a combustion chamber. A burner for combusting the waste gases, which are supplied together with the combustion gas to the burner, protrudes from below into this basic body into the combustion chamber. At the top, the extent of the combustion chamber is limited by a splash guard, above which, a scrubbing or flushing chamber is located. In this flushing chamber, there is a centrally disposed nozzle, with the help of which a spray cone of a flushing material is produced, with which aerosols and solids components are flushed out of the combusted waste gas. By means of the splash guard, the flushing agent is prevented from being sprayed into the combustion chamber and, with that, onto the burner or into the flame.

The residues, flushed out, are conveyed downwards along the inside of the cylindrical outer wall and discharged through a drain the basic body.

It has proven to be a disadvantage of this apparatus for purifying waste gases that the purification processes of the apparatus itself are very expensive and that in particular, there are difficulties with cleaning the combustion space. In addition, contamination of the combustion gas nozzles and of the waste gas nozzle is almost unavoidable, so that regular maintenance of the burner is required to assure reliable operation.

It is therefore an object of the invention to provide an apparatus for purifying waste gases, which can be manufactured cost-effectively and by means of which the disadvantages of the state of the art can be avoided.

This objective is accomplished by an apparatus for purifying waste gases of the initially mentioned type owing to the fact that the burner is fastened centrally in the cover, that the burner has burner nozzles and at least one nozzle for supplying waste gas, which are directed vertically downward in the combustion space and that the reaction products, produced by the combustion process, are passed along the inside of the outer pipe into the scrubbing space, that the basic body forms a boundary at the lower end of the combustion space, that, within the outer pipe, an inner pipe is provided, which extends as far as into the basic body and ends at a distance above the bottom of the basic body, that the reaction products, formed by the combustion process, are passed along the interior side of the outer pipe from the basic body upwards into the scrubbing space and that the absorbent, after it is dispersed in the scrubbing space and enriched with the reaction products, is discharged along the inner side of the outer pipe over the basic body.

With this easily realized apparatus for purifying waste gases, a higher availability, as well as a significant improvement in the apparatus for purifying waste gases are attained on the one hand. In particular, an effect of the combustion process by residues of the combustion, which are deposited on the burner, in the combustion space or on the interior side of the outer combustion pipe or at the bottom of the combustion space, is avoided. A cross sectional constriction of the or a blockage of the combustion gas nozzles, which is otherwise possible, is also avoided.

In order to achieve particularly good mixing of the combustion gas with the waste gas, the burner has several waste gas nozzles, which are surrounded concentrically by the combustion gas nozzles.

A cooling device is assigned to the burner in order to avoid possible overheating. For this purpose, a spraying nozzle for the absorbent and scrubbing agent is disposed within the outer pipe and above the burner. This spraying nozzle, on the one hand, serves for flushing the waste gases emerging from the combustion chamber and, on the other hand, at the same times cools the housing of the burner. The spray nozzle may be constructed as a ring nozzle, as a full conical nozzle or as a hollow conical nozzle, so that a sufficient amount of flushing liquid strikes the housing of the burner.

The ring nozzle is fastened above the cover at the inner wall of the outer pipe. The thereby produced ring of spray is to be directed in this case parallel to the inner wall of the outer pipe, as well as against the housing of the burner, so that the whole of the cross section within the outer pipe is covered.

A significant improvement in the cooling of the burner is achieved when the spraying nozzle is connected over a feed line, over which the absorption or scrubbing agent can be supplied to the spraying nozzle, with a chamber within the burner.

In this way, the burner is cooled internally, so that higher burner temperatures can be permitted. This construction is therefore particularly suitable for hydrogen burners. The chamber should be disposed between the combustion gas nozzles and the waste gas nozzle, surrounding these concentrically.

In order to avoid excessive heating of the cover and the burner, a heat shield, which surrounds the burner concentrically and expands in the downwards direction, is disposed between the combustion space and the cover. This heat shield furthermore prevents excessive cooling of the waste gases, which are to be combusted.

An inner pipe, which surrounds the heat shield, is provided in order to form the side boundary of the combustion space.

An annular gap is formed between the heat shield and the interior wall of the inner pipe. The space between the cover and the heat shield is connected over openings with the space outside of the outer pipe. By these means, and in conjunction with the reduced pressure within the combustion space, constant flushing of the space between the heat shield and the cover is achieved.

In a continuation of the invention, a nozzle ring with nozzles, which are designed for supplying a cleaning agent and directed against the interior wall of the inner pipe, is disposed in the space between the cover and the heat shield.

By these means, it becomes possible, during the operating pauses of the apparatus, to clean the combustion space with water or an absorbent, without having to open the space for this purpose.

In order to ensure that the absorbent or flushing agent is discharged constantly without interference with the combustion process, the bottom of the basic body is provided at its lowest point with a drain.

The combustion space is terminated at its lower end by a basic body with a conical or a downwardly curved bottom, which is supplied wit a drain at its lowest point. With that, a constant discharge of the absorbent or flushing agent is assured, without having to interfere with the combustion process.

In order to attain good guidance of the gas and, in particular, to deflect the purified waste gas and pass it into the scrubbing space, the inner pipe protrudes into the basic body and ends at a distance above the bottom.

In a special embodiment, the outer pipe and the inner pipe in each case consist of an upper part and lower part which are connected detachably to each other, the basic body being detachably connected with the outer pipe or the lower part of the outer pipe. By these means, a considerable simplification of the cleaning or maintenance processes is attained which can be improved even further owing to the fact that the upper part of the outer pipe with the burner attached thereto, the cover, the upper part of the inner pipe, the heat shield, the openings and the nozzle ring can be moved axially upward or the basic body can be moved axially downward.

In a further variation of the invention, the upper part of the inner pipe has at its lower end a cross-sectional constriction, which forms a circular annular gap with the upper end of the lower part. By these means, an increase in the efficiency of the combustion process is achieved, since a recycling of a portion of the already combusted waste gas is induced therewith and, as a result, the waste gas is supplied repeatedly to the combustion process. In addition, a flushing of the inside of the inner pipe and reduction in the amount of the deposits are achieved therewith.

In order to prevent that, in this case, flushing agents or absorbents penetrate into the combustion space, a protecting pipe, which covers the upper edge of the lower part is disposed between the upper part of the outer pipe and the upper part of the inner pipe.

In a further continuation of the invention, the combustion space is connected by leadthroughs, in which devices for igniting or monitoring the burner are disposed, with the space outside of the pipe, or the burner itself contains igniting or monitoring devices.

Between the cover and the inside of the outer pipe, there furthermore is a brush edge, which discharges the flushing agent or absorbent along the inside of the outer pipe and, at the same time, brings about a more intensive wetting of the waste gas.

Above the cover, the outer pipe is connected over one or more traps to equipment for producing a reduced pressure in the combustion space and in the scrubbing space. By producing the reduced pressure, aspiration of the waste gas from the combustion space is achieved on the one hand. At the same time, the waste gases are prevented from emerging over the flushing openings and the drain.

Figure 2:
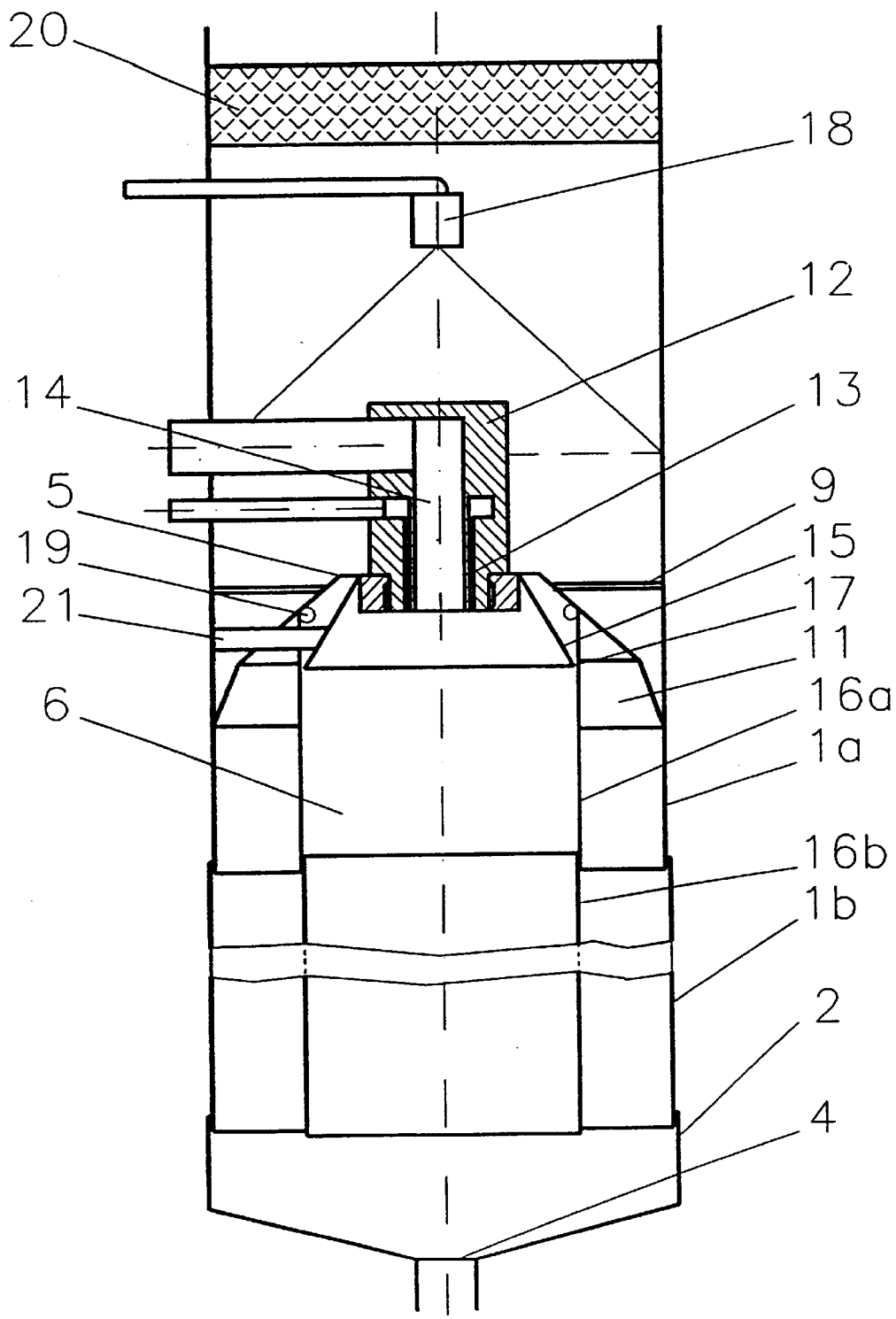
Figure 3:
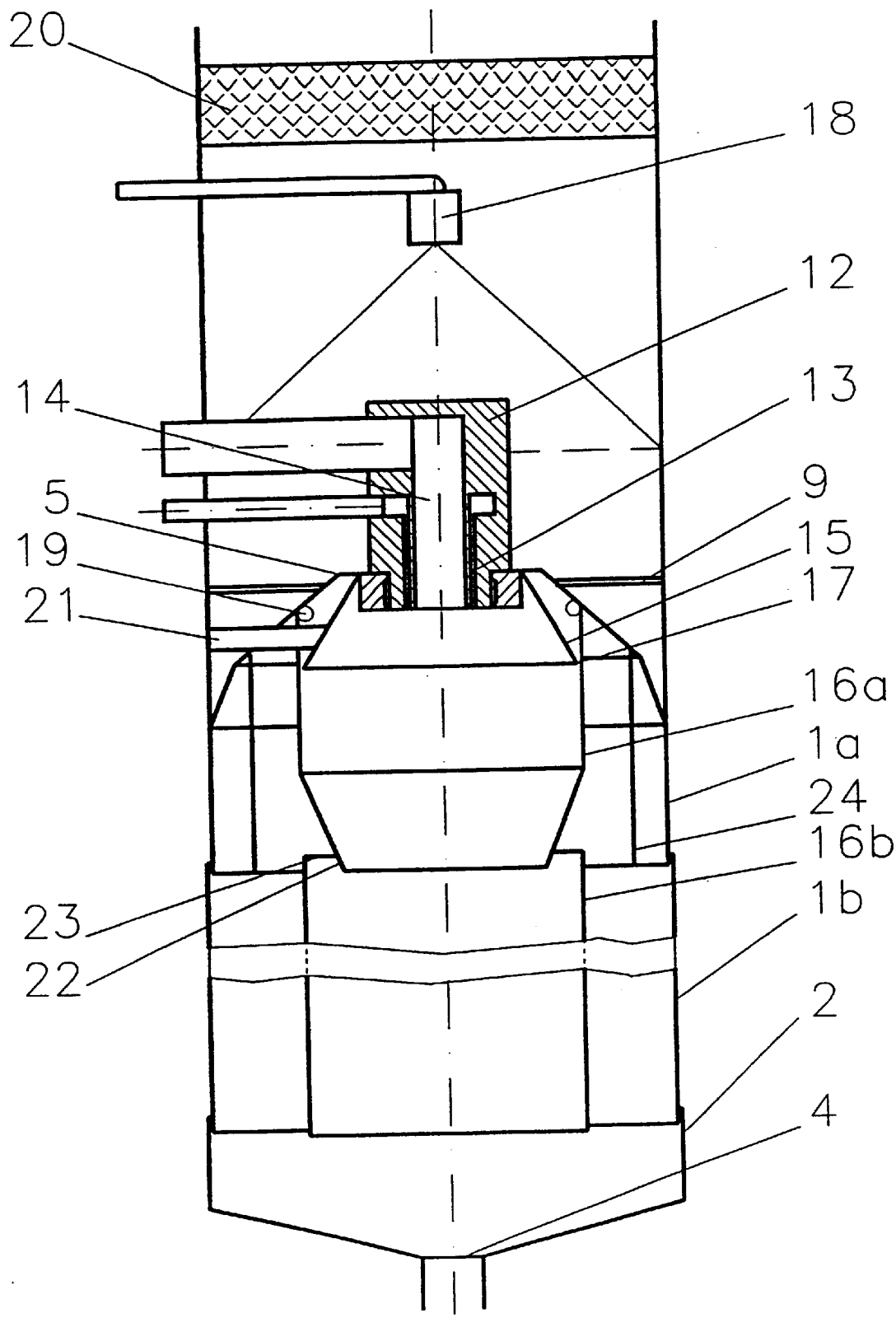
Figure 5:
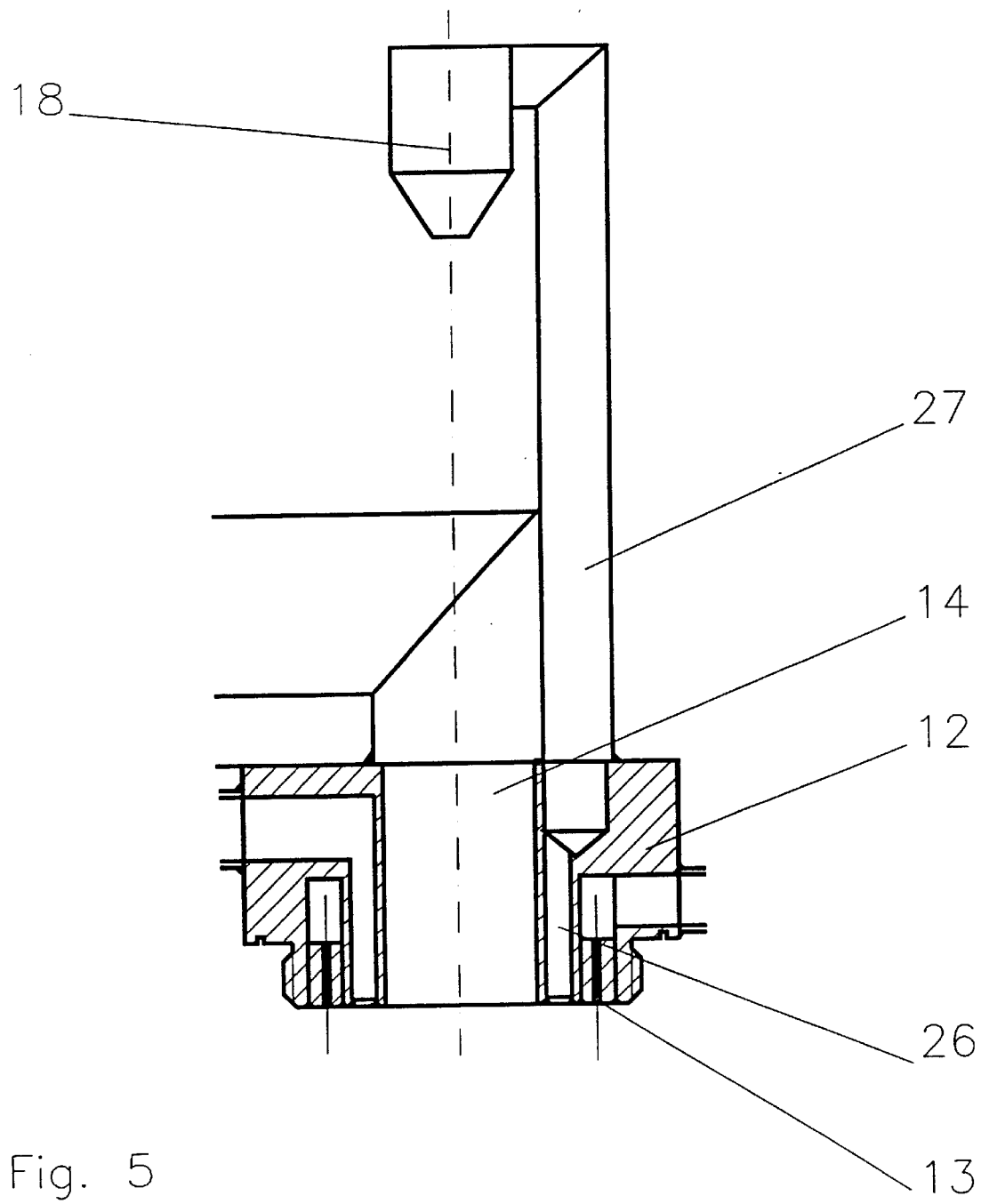
Figure 7:
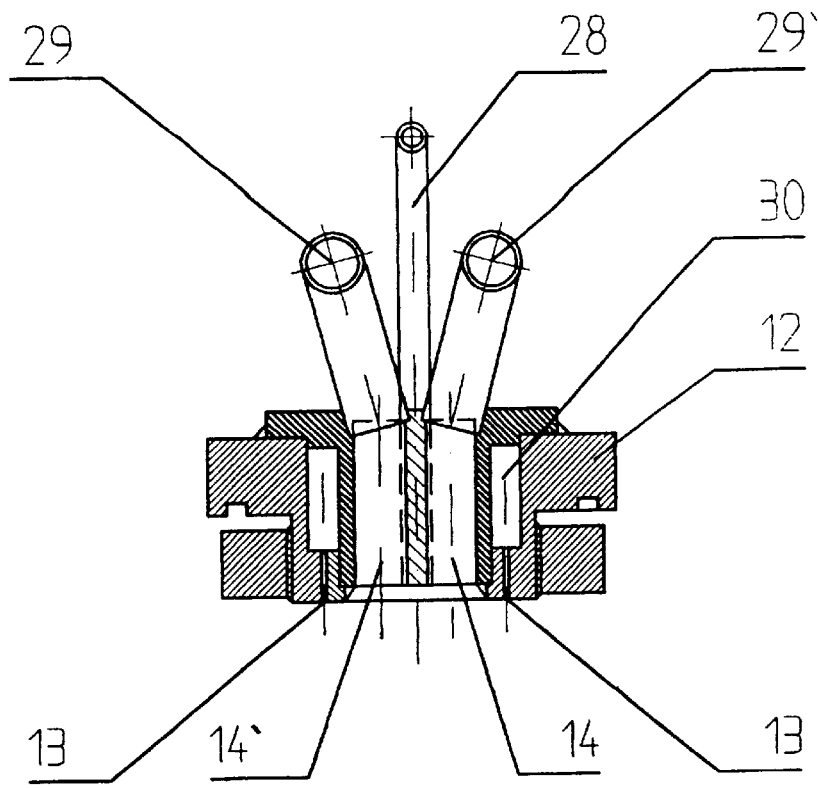
Figure 6:
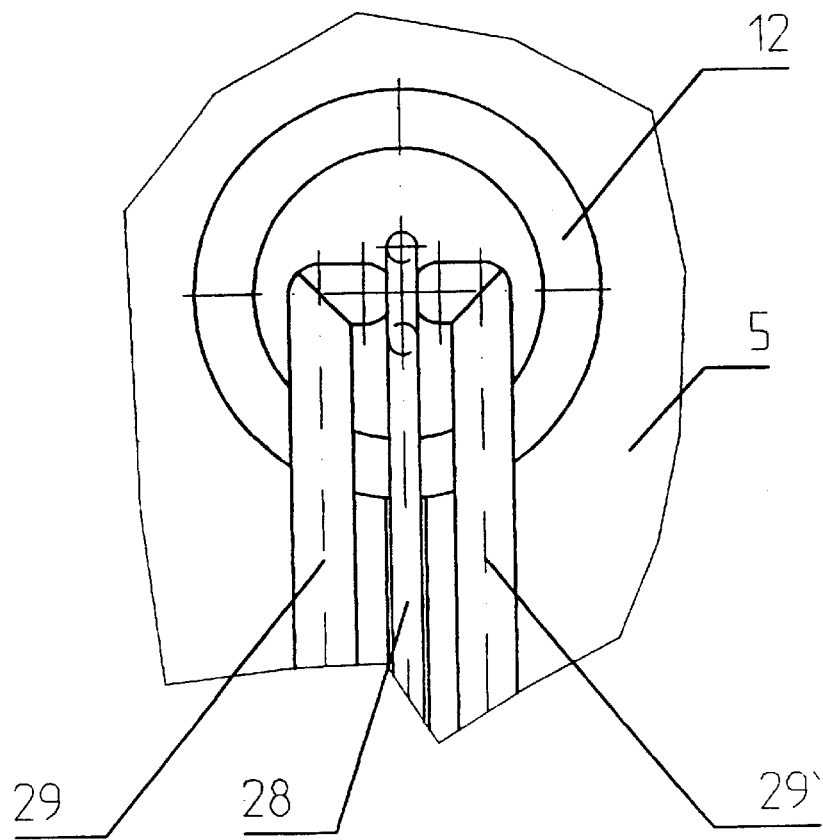

The invention will be explained in greater detail in the following by means of an example. In the associated drawings, FIG. 1 shows a diagrammatic, sectional representation of an inventive apparatus for purifying waste gases, FIG. 2 shows the apparatus of FIG. 1 with a dividable burner space, FIG. 3 shows an apparatus for purifying waste gases with recycling of the waste gases, FIG. 4 a simplified apparatus for purifying waste gases without a separate combustion space, FIG. 5 shows a diagrammatic, sectional representation of a burner with an additional cooling device, FIG. 6 shows a sectional representation of a burner that is provided with combustion gas nozzles and waste gas nozzles and FIG. 7 shows a plan view of the burner of FIG. 6.

Corresponding to FIG. 1, the apparatus for purifying waste gases consists of an outer pipe 1, which is arranged vertically and closed off at its lower end by a basic body 2. The basic body 2 has a bottom 3, which is conical or curved downward and is provided at it lowest point with a drain 4.

Within the outer pipe 1, an umbrella-like cover 5 is provided, which expands in the downwards direction and divides a lower combustion space 6 from a scrubbing space 7 above. The cover 5 is held in the outer pipe 1 by connecting elements 9, which are provided with openings 8 and may be pipe sections, to which the cover 5 is fastened. In order to permit the passage of gas from the combustion space 6 to the scrubbing space 7, the diameter of the cover 5 is less then the internal diameter of the outer pipe 1. As a result, an annular gap 10 is kept free in the region of the inner wall of the outer pipe 1 and covered by a brush edge 11 fastened to the cover 5.

Furthermore, a burner 12, with downwardly pointing combustion gas and nozzle 13 and waste gas feeding nozzle 14, is fastened centrally in the umbrella-like cover 5. The burner 12 can be fastened to the cover 5 by screws or bolts or by a clamping ring. In order to obtain good mixing of the waste gas, which is supplied through the waste gas feeding nozzle 14, with the combustion gas, the waste gas feeding nozzle 14 is constructed as a central nozzle, which is surrounded by an annular combustion gas nozzle 13 or by several combustion gas nozzles 13. As combustion gas, natural gas in particular, which is combusted with an excess of oxygen, or hydrogen, which is also combusted with an excess of oxygen, comes into consideration.

Below the cover 5, there is a heat shield 15, which surrounds the burner 12 and the combustion gas and waste gas feeding nozzles 13, 14, expands conically downwards and is used, in particular, for reducing the heat load on the cover 5. An internal pipe 16, which is fastened to the cover 5 and surrounds the heat shield 15, extends downwards from the cover 5 to form the boundary of the combustion space 6. Moreover, an annular gap 17 is kept free between the heat shield 15 and the interior wall of the inner pipe 16, so that the space between the cover 5 and the heat shield 15 is connected through openings 8 with the space outside of the outer pipe 1. By these means, flushing of the space between the cover 5 and the heat shield 15 is attained, when there is a reduced pressure in the combustion space 6.

The inner pipe 16, which extends up into the basic body, serves at the same time to separate the flame in the combustion space 6 from the waste gases, which are added in the thermal reaction region and which are passed as reaction gases from the basic body 2 to the inside of the outer pipe 1 upwards into the scrubbing space 7.

In the scrubbing space 7 above the burner 12, there is a spray nozzle 18 for supplying an absorbent and dividing it very finely or producing very small droplets of it. This absorbent serves for washing out the gaseous or solid reaction products formed curing the combustion of the waste gas. The spraying cone of the spray nozzle 18 is constructed as a full cone and extends up to the inside of the outer pipe 1. At the same time, cooling of the burner 12 is achieved in this manner.

The absorbent is dispersed uniformly in the scrubbing space 7 by the spray nozzle 18 and subsequently passed through the cover 5 and the thereto attached brush edge 11 to the inside of the outer pipe and flows from there into the basic body 2 and over the drain 4 into a collector, which is not shown.

For cleaning the inside of the inner pipe 16, there is, at the upper end of this pipe 16 at the cover 5, a nozzle ring 19, with which water or an absorbent can be sprayed onto the inside of the inner pipe 16 during pauses in the operation, so that so that deposits there can be removed or reduced.

The scrubbing space 7 is closed off al the top by a trap 20 for retaining solid or liquid aerosols. The tap is connected with an exhaust installation, which at the same time produces the required reduced pressure.

For igniting the burner flame and for monitoring the combustion process, a leadthrough 21 extends from the outer pipe 1 through the cover 5 into the heat shield 15. A pilot light and/or a UV flame sensor may be disposed in the leadthrough.

FIG 2 basically shows the apparatus for purifying waste gases, the outer and inner pipes 1, 16 being constructed in divided form so that the apparatus can be disassembled and maintained particularly easily. The outer pipe 1 comprises for this purpose an upper and a lower part 1*a*, 1*b* and the inner pipe 16 comprises an upper and a lower part 16*a*, 16*b*, which in each case are detachably connected to one another. In addition, the basic body 2 may be detachably connected with the outer pipe 1 or with the lower part 1*a* of the outer pipe 1.

The upper part 1*a* of the outer pipe 1, to which the burner 12 is attached, with the cover 5, with the upper part 16*a* of the inner pipe 16, with the heat shield 15, with the openings 8 and the nozzle ring 20, can also be constructed so that it can be moved axially upwards or the basic body 2 can be constructed so that it can be moved axially downwards. As a result, the combustion space 6 can be cleaned particularly easily.

FIG. 3 shows a special variation of the invention, for which internal recycling of the waste gas and internal flushing of the inner pipe 16 is realized. Fundamentally the construction corresponds to that of the variation shown in FIG. 2, the upper part 16*a* of the inner pipe 16 having at the lower end a cross sectional constriction 22, which is concentric with the lower part 16*b* and protrudes into it. Parts of the waste gas, passed upwards through the annular gap 23 so formed between the lower part 16*b* and the inside of the lower part 1*b*, are supplied once again to the combustion space 6 and exposed once again there to the hot flame. Furthermore, by means of this recycling, flushing of the inside of the lower part 16*b* is attained, so that deposition of particles is prevented at least partially there.

A protective pipe 24, which covers the upper edge of the lower part 16*b*, is located between the upper part 1*a* of the outer pipe 1 and the upper part 16*a*, in order to prevent penetration of absorbent through the annular gap 23 into the combustion space.

By means of this protective pipe 24, excessive cooling of the upper part of the combustion space 6 is prevented at the same time.

Figure 4:
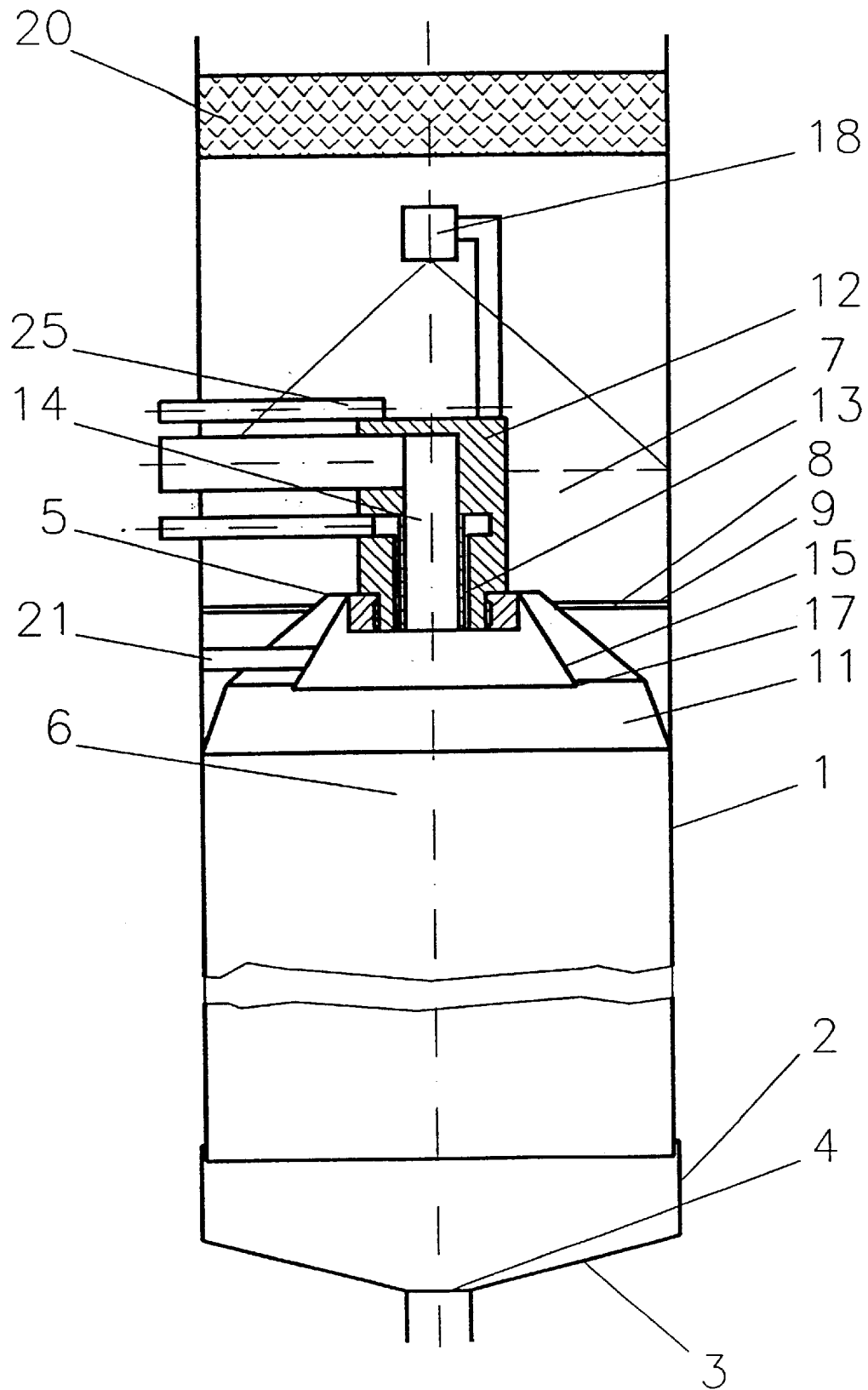

FIG. 4 shows a simplified variation of the invention, for which the combustion space 6 is surrounded only by the outer pipe 1. In order to attain better cooling of the burner 12 here, the absorbent is supplied to the spray nozzle 18 over the burner 12, in that the feed line 25 is passed into the housing of the burner, as explained in the following.

A particularly effective variation for cooling the burner 12 is evident from FIG. 5. For this variation, a chamber 26, which surrounds the waste gas nozzle 14 concentrically, is disposed between the waste gas nozzle 14 and the combustion gas nozzle or nozzles 13. This chamber 26 is connected on the one hand, over a pipeline 27 with the spray nozzle 18 and, on the other, with a device for feeding the flushing agent or absorbent. In this way, a particularly intensive cooling of the burner is achieved without any effect on the temperature of the combustion process itself. With this, the variation is suitable particularly for hydrogen burners or for combustion processes having a higher temperature.

FIGS. 6, 7 show an arrangement for the simultaneous combustion of waste gases from different processes. As can be seen from FIG. 6, two waste gas nozzles 14, 14' are disposed directly adjacent to the burner 12 for this variation, the waste gases being supplied over separate gas-feeding systems 29, 29'. The combustion gas nozzles 13 surround the waste gas nozzles 14, 14' and are supplied over a combustion gas feeding system, which is not shown, over an annular compensating chamber 30. An additional oxygen-supplying system 29 ensures a combustion with a particularly high excess of oxygen.

By means of this arrangement, the simultaneous combustion of waste gases, which would react in an uncontrolled manner with one another outside of the combustion chamber, becomes possible. As a result, a significantly more effective utilization of the apparatus for the purification of waste gases is achieved at the same time.

Basically, the number of waste gas supplying systems 29, 29' is not limited, the number of waste gas nozzles 14, 14' being limited only by the size of the burner 12. For reliable operation with several waste gas supplying systems, it is merely necessary to ensure that the waste gas is reliably prevented from flowing back into the waste gas supplying systems 29, 29'.

List of Reference Symbols

1 outer pipe
1*a* upper part
1*b* lower part
2 basic body
3 bottom
4 drain
5 cover
6 combustion space
7 scrubbing space
8 opening
9 connection element
10 gap
11 brush edge
12 burner
13 combustion gas nozzle
14 waste gas nozzle
15 heat shield
16 inner pipe
16*a* upper part
16*b* lower part
17 annular gap
18 spray nozzle
19 nozzle ring
20 trap
21 leadthrough
22 cross sectional constriction 23 annular gap
24 protective pipe
25 feed line
26 chamber
27 pipeline
28 oxygen supplying system
29 waste gas supplying system
30 compensation chamber

We claim:

1. An apparatus for purifying waste gases, particularly waste gases from CVD (chemical vapor deposition), plasma etching or similar processes, with at least one combustion space, which is in a vertical arrangement within an outer pipe and is limited at the top by an umbrella-like cover, and an internally or externally mixing burner, the combustion gas nozzles of which protrude into the combustion space, combustion gas, oxygen or air and waste gas being supplied to the burner, as well as to means for supplying and discharging oxidizing agents and/or absorbents to a scrubbing space above the combustion space, characterized in that the burner (12) is fastened centrally in the cover (5), the burner (12) has combustion gas nozzles (13) and at least one waste gas nozzle (14), which are directed vertically downwards into the combustion space (6), in that the combusiton space (6) is bounded at the lower end by a basic body (2), in that, within the outer pipe (1), an inner pipe (16) is provided, which extends as far as into the basic body (2) and ends at a distance above the bottom (3) of the basic body (2), in that the reaction products, formed during the combustion process, are passed along the inside of the outer pipe (1) from the basic body (2) upwards into the scrubbing space (7) and in that the absorbent, after being dispersed in the scrubbing space (7) and enriched with reaction products, is discharged along the interior side of the outer pipe (1) over the basic body (2).

2. The apparatus of claim 1, characterized in that the combustion gas feeding nozzles (13) surround the waste gas nozzles (14) concentrically.

3. The apparatus of claims 1 or 2, characterized in that a cooling device is assigned to the burner (12).

4. The apparatus of one of the claims 1 or 2, characterized that, within the outer pipe (1) and above the burner (12), a spray nozzle (18) for the absorbent or scrubbing agent is disposed, which is constructed as a ring nozzle, a full conical nozzle or a hollow conical nozzle.

5. The apparatus of claim 4, characterized in that the spray nozzle (18) is connected with a chamber (26) within the burner (12) over a pipeline (27), over which the absorbent or scrubbing agent can be supplied to the spray nozzle (18).

6. The apparatus of claim 5, characterized in that the chamber (26) is disposed between the combustion gas feeding nozzles (13) and the waste gas nozzle (14) and surrounds these concentrically.

7. The apparatus of claims 1 or 2, characterized in that a heat shield (15), which surrounds the burner (12) concentrically and expands downwards, is disposed between the combustion space (6) and the cover (5).

8. The apparatus of claim 7, characterized in that an inner pipe (16) is provided within the outer pipe (1), extends from the cover (5) downwards and surrounds the heat shield (15).

9. The apparatus of claim 8, characterized in that an annular gap (17) is formed between the heat shield (15) and the internal wall of the inner pipe (16) and in that the space between the cover (5) and the heat shield (15) is connected through openings (8) with the space outside of the outer pipe (1).

10. The apparatus of one of the claim 7, characterized in that a nozzle ring (19), with nozzles for supplying a purifying agent, which are directed against the interior wall of the inner pipe (16), is disposed in the space between the cover (5) and the heat shield (15).

11. The apparatus of claim 1 or 2, characterized in that the bottom (3) of the basic body (2) is provided at its lowest point with a drain (4).

12. The apparatus of claim 1 or 2, characterized in that the outer pipe (1) and the inner pipe (16) in each case consist of an upper part (1a, 16a) and a lower part (1b, 16b), which are detachably connected with one another.

13. The apparatus of claim 12, characterized in that the basic body (2) is detachably connected with the outer pipe (1) or the part (1b) of the outer pipe (1).

14. The apparatus of claim 12, characterized in that the upper part (1a) of the outer pipe (1), together with the cover (5) and the thereto attached burner (12), and the upper part (16a) of the inner pipe (16), can be moved axially upwards.

15. The apparatus of claim 12, characterized in that the basic body (2) can be moved axially downwards.

16. The apparatus of claim 17, characterized in that the upper part (16a) of the inner pipe (16) has at its lower end a cross sectional constriction (22) which, together with the upper end of the lower part (16b), forms an annular gap (23).

17. The apparatus of claim 16, characterized in that a protective pipe (24), the upper edge of which covers the lower part (16b), is disposed between the upper part (1a) of the outer pipe (1) and the upper part (16a) of the inner pipe (16).

18. The apparatus of claims 1 or 2, characterized in that the combustion space (6) is connected by leadthroughs (21) with the space outside of the pipe (1) and in that devices for igniting or monitoring the burner (12) are disposed in the leadthroughs (21).

19. The apparatus of claims 1 or 2, characterized in that the burner (12) contains devices for its ignition and monitoring.

20. The apparatus of claims 1 or 2, characterized in that there is a brush edge (11) between the cover (5) and the inside of the outer pipe (1).

21. The apparatus of claims 1 or 2, characterized in that the outer pipe (1) is connected above the cover (5) with one or several traps (20) to equipment for producing a reduced pressure in the combustion space (6) and in the scrubbing space (7).

* * * * *